United States Patent
Lo et al.

(10) Patent No.: US 7,266,056 B2
(45) Date of Patent: Sep. 4, 2007

(54) METHOD OF FOCUS POSITION ADJUSTMENT BY CONTROLLING A DEVIATION VALUE AND SYSTEM THEREOF

(75) Inventors: Chi-Chun Lo, Hsin-Chu (TW); Kun-Hung Hsieh, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 580 days.

(21) Appl. No.: 10/673,416

(22) Filed: Sep. 30, 2003

(65) Prior Publication Data
US 2004/0208092 A1    Oct. 21, 2004

(30) Foreign Application Priority Data
Apr. 15, 2003    (TW) ............................... 92108734 A

(51) Int. Cl.
*G11B 7/095* (2006.01)
(52) U.S. Cl. ................... 369/44.25; 369/44.26
(58) Field of Classification Search ............ 369/44.25, 369/44.26; *G11B 7/095*
See application file for complete search history.

(56) References Cited

U.S. PATENT DOCUMENTS

| | | | |
|---|---|---|---|
| 6,240,055 B1 | 5/2001 | Takamine et al. | |
| 6,407,968 B1 | 6/2002 | Nakata et al. | |
| 6,414,921 B1 * | 7/2002 | Kim | 369/47.44 |
| 6,459,661 B1 * | 10/2002 | Iwanaga | 369/44.26 |
| 6,522,605 B1 * | 2/2003 | Tada et al. | 369/44.26 |

\* cited by examiner

*Primary Examiner*—Aristotelis M Psitos
(74) *Attorney, Agent, or Firm*—Troxell Law Office, PLLC

(57) ABSTRACT

The present invention provides a focus position adjustment method for adjusting a focus position by which an optical storage device reads an optical storage medium. The optical storage medium comprises a header and a recording area. The optical storage device generates a focus error signal as reading the medium and utilizes the focus error signal to control the focus of the optical pickup head. After the optical storage device finishes tracking closed loop, the method is performed according to the deviation value between the levels of focus error signals of the header and the recording area to adjust the focus position to make the deviation value fall in a predetermined range. The system comprises a deviation value detection module for determining the deviation value and a focus control module for adjusting the focus position.

15 Claims, 5 Drawing Sheets

Figure 1:
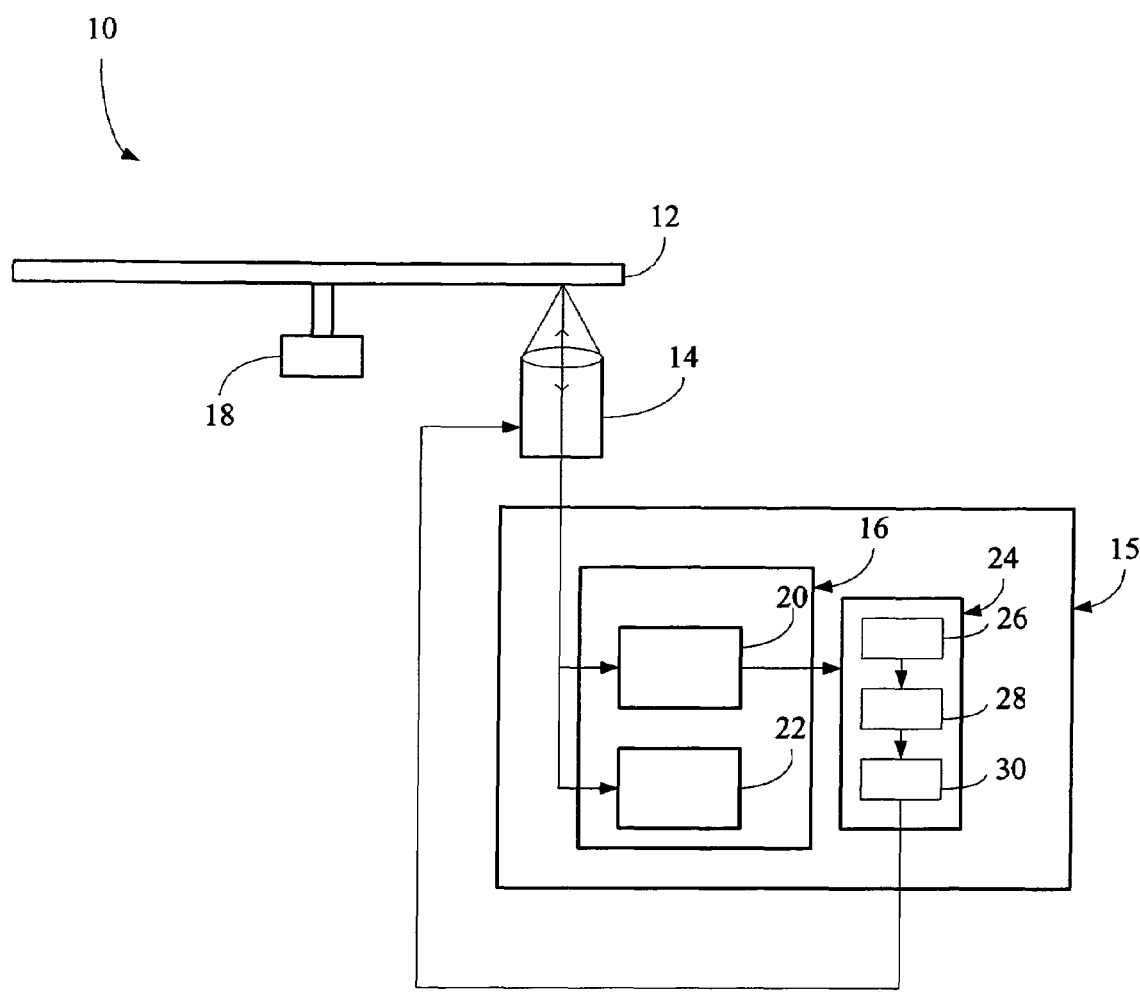

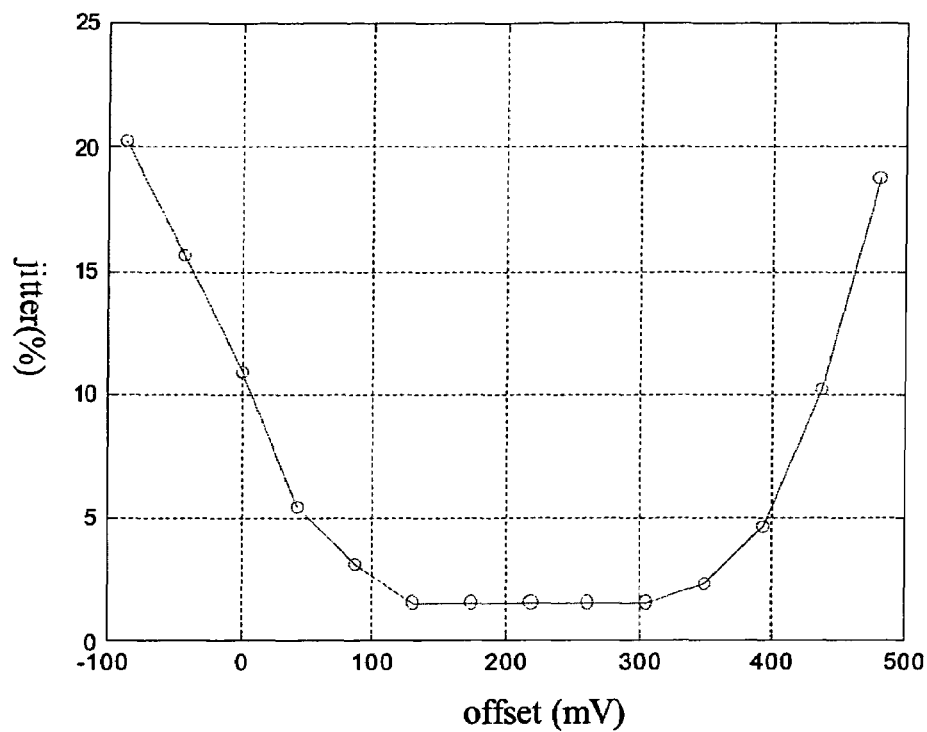
FIG. 2-A
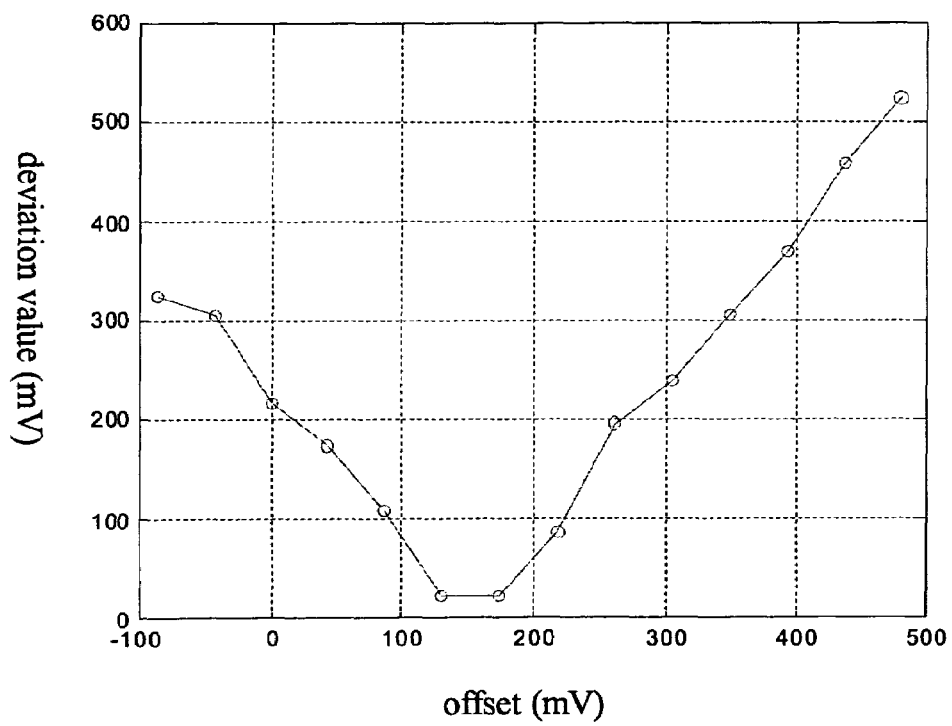
FIG. 2-B

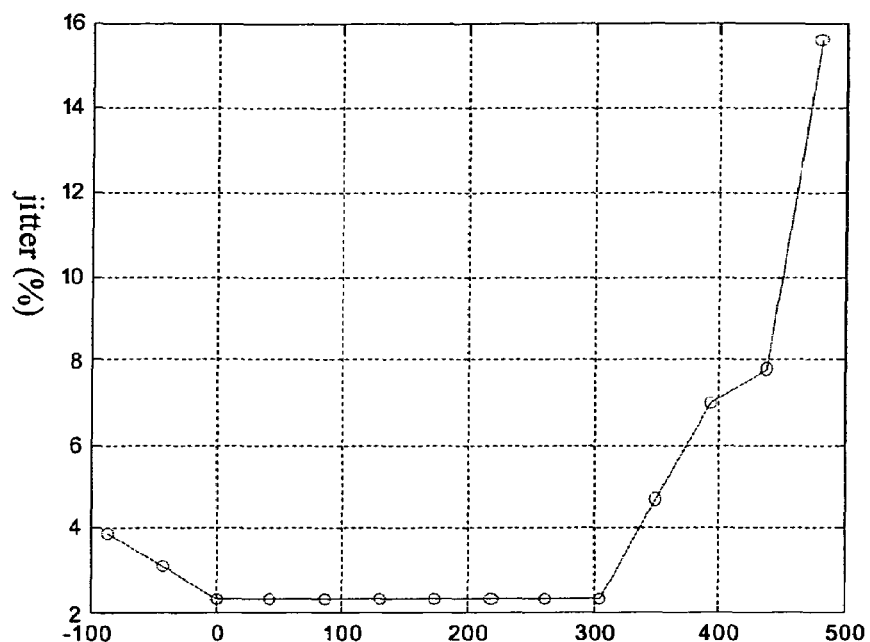
FIG. 3-A
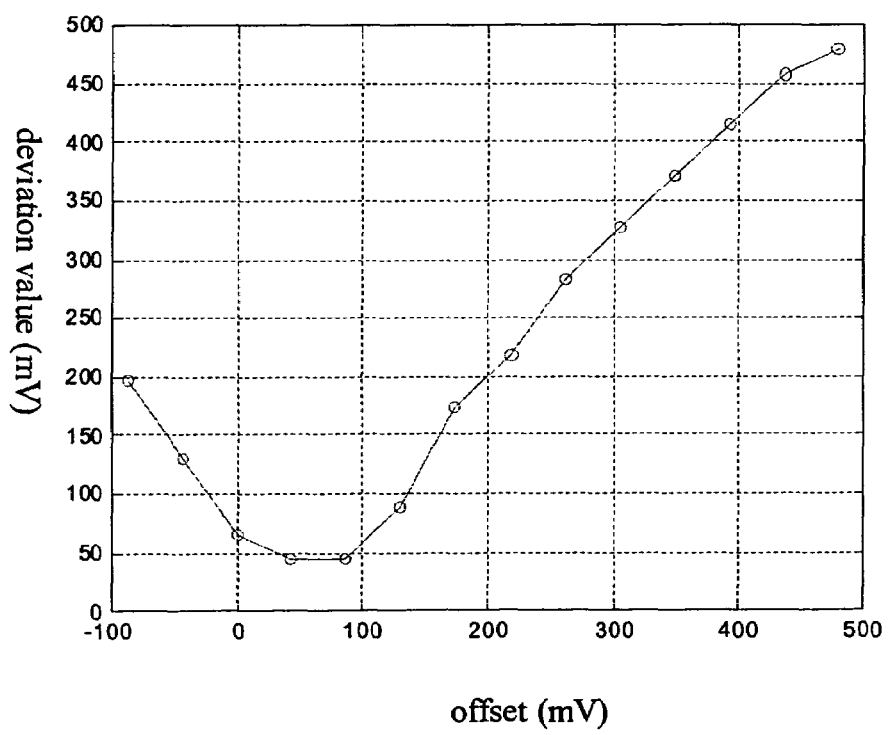
FIG. 3-B

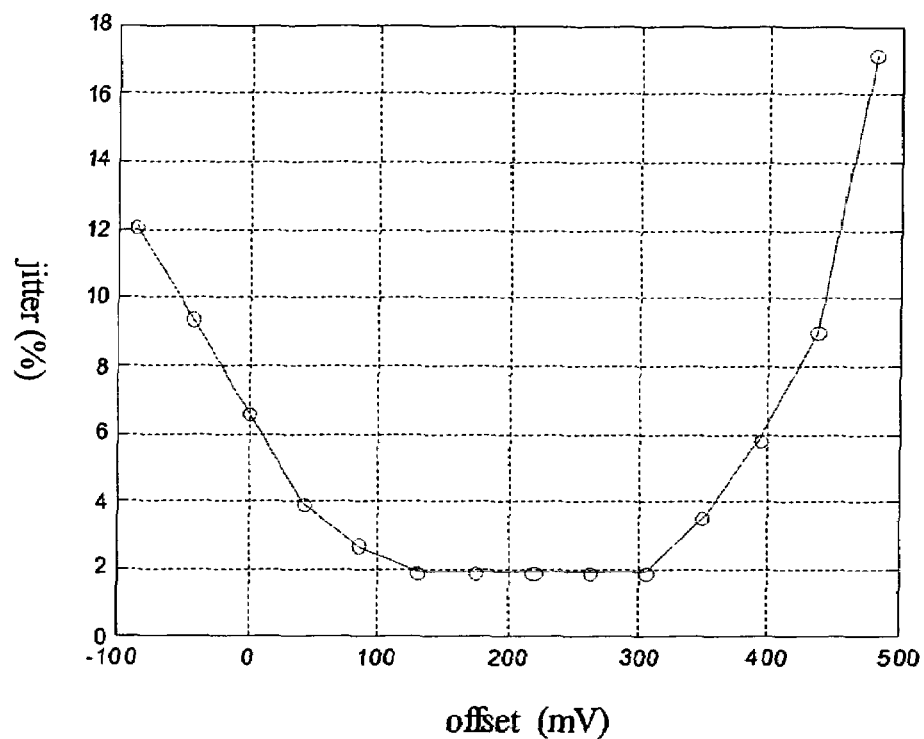
FIG. 4-A
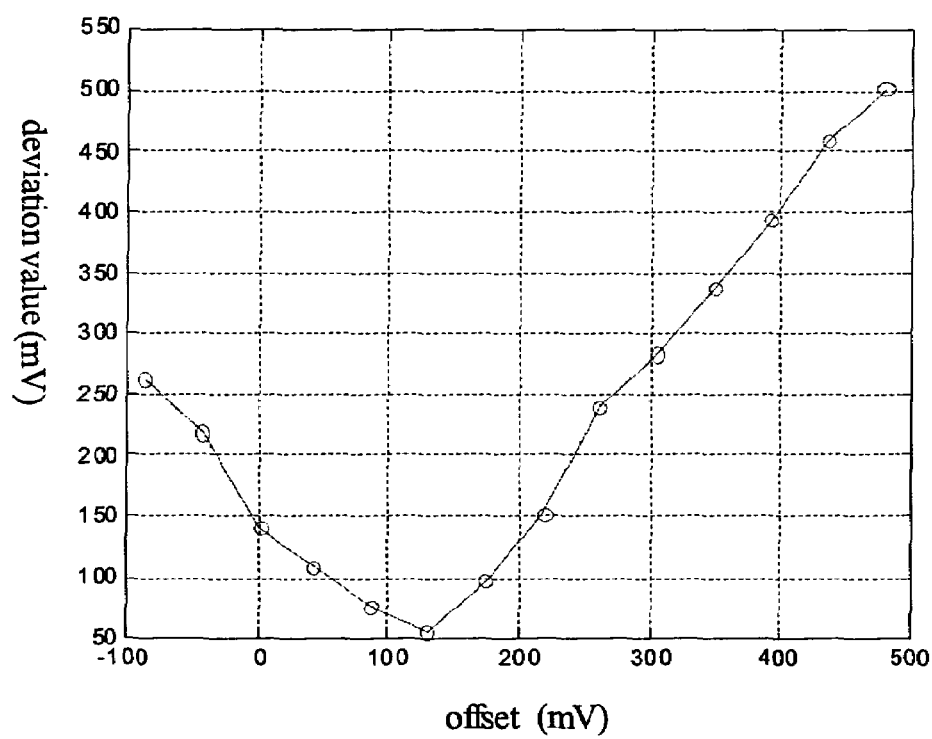
FIG. 4-B

METHOD OF FOCUS POSITION ADJUSTMENT BY CONTROLLING A DEVIATION VALUE AND SYSTEM THEREOF

BACKGROUND OF THE INVENTION

1. Field of the Invention

The present invention relates to a focus position adjustment method and system thereof, and more particularly to a focus position adjustment method and system thereof for an optical storage device.

2. Description of the Prior Art

A conventional optical disc drive apparatus comprises an optical pickup head for generating a laser beam to converge to an optical disc and receiving a laser beam reflected from the optical disc. The optical disc drive apparatus performs focus servo and tracking servo in order to accurately read or write data on the optical disc. The focus servo refers to control the laser beam from the optical disc drive apparatus to the optical disc so that the laser beam can converge to a specific focus position. In the prior art, the focus servo is performed according to a focus error signal of a laser beam reflected from the optical disc. The focus error signal represents the shift from the focus position of the laser beam on the optical disc. When focus positions are different, different jitters are obtained. Generally, the smaller the jitter is, the more accurate focus position is obtained.

However, the focus servo of the prior art has many problems. First, in a conventional optical disc drive apparatus, the focus servo adjusts focus position by searching the maximum value of the reproduction signal or the minimum value of the jitter. However, both perform differently in different addresses or data areas so that errors usually occur. Besides, because the calculation process for the focus error signal, the jitter and the focus position is complicated, it is very time-consuming and energy-consuming to get the smallest jitter. Second, the focus servo control method of the prior art is used for single spiral land groove format (SS-L/GFMT) optical disc without distinguishing a land track and a groove track. Therefore, it is not able to provide accurate focus servo for the high-density optical disc. Third, in a conventional optical disc drive apparatus, it is not considered that the zero level of the focus error signal is not always the best focus position. Therefore, errors usually occur when reading data from the optical disc. About the problems of the prior art, please refer to U.S. Pat. No. 6,240,055, focus position adjustment device and optical disc drive apparatus.

The technology disclosed in U.S. Pat. No. 6,240,055 is used for solving the above problems. However, U.S. Pat. No. 6,240,055 still utilizes the smallest jitter to look for the best focus position; the process for the focus servo cannot be effectively speeded up.

Furthermore, the technology disclosed in U.S. Pat. No. 6,240,055 needs an error rate counter, an RF detector, and a complicated algorithm to calculate the best focus position. A lot of computing resource and time are needed. Moreover, if the optical disc is blank, there will be no reproduction signal for estimating the jitter. Therefore, the disclosed technology must record a test signal in a drive test area on the optical disc, then perform the above mentioned procedure.

The technology disclosed in U.S. Pat. No. 6,407,968, optical information recording/reproducing apparatus having focus error signal compensation, detects a variation value and compensates the focus error signal based on the variation value to obtain the optimal focus position. The disclosed technology solves the time-consuming problem in conventional focus servo control.

Conventionally, when the optical disc drive apparatus reads an optical disc that is recorded with data, it goes through seeking track, tracking closed loop, and ON state of focus servo for reading each of the tracks on the optical disc.

The technology disclosed in U.S. Pat. No. 6,407,968 detects the variation value under the ON state of focus servo. The time for adjusting the focus position is increased. Besides, the variation value responses to a tracking error signal, and the tracking error signal and focus error signal are necessary for obtaining the variation value. Therefore, the technology disclosed in U.S. Pat. No. 6,407,968 is still time-consuming.

Therefore, the primary objective of the present invention is to provide a focus position adjustment method and system thereof to solve the problems in the prior art.

SUMMARY OF THE INVENTION

An object of the present invention is to provide a focus position adjustment method and system thereof for adjusting a focus position by which an optical storage device reads an optical storage medium.

Another objective of the present invention is to provide a focus position adjustment method and system thereof for adjusting the focus position without utilizing the jitter.

According to an embodiment of the present invention, a focus position adjustment system is used for adjusting a focus position by which an optical storage device reads an optical storage medium. The optical storage medium comprises a header and a recording area. A focus error signal is generated as the optical storage device reads the medium and is used to control focusing of the optical pickup head. The focus position adjustment method is performed after the optical storage device finishes tracking closed loop. According to a deviation value generated by comparing the level of the focus error signal of the header with a reference level, adjust the focus position to make the deviation value fall in a predetermined range.

In the present invention, the optimal focus position is obtained by controlling the deviation value. Accordingly, the present invention utilizes the original function of the servo control of an optical storage device without extra hardware. Also, the present invention needs only a little extra calculation to avoid complicated calculation of the jitter. Therefore, the present invention substantially saves the time for the optical pickup head to look for the optimal focus position, and hence the efficiency of the optical storage device is enhanced.

The advantage and spirit of the invention may be understood by the following recitations together with the appended drawings.

BRIEF DESCRIPTION OF THE APPENDED DRAWINGS

FIG. 1 is a schematic diagram of an optical storage device with a focus position adjustment system according to the present invention.

FIG. 2-A is a diagram showing the relationship of the offset and the jitter when reading the land track on the optical storage medium by using the system according to the present invention.

FIG. 2-B is a diagram showing the relationship of the offset and the deviation value when reading the land track on the optical storage medium by using the system according to the present invention.

FIG. 3-A is a diagram showing the relationship of the offset and the jitter when reading the groove-track on the optical storage medium by using the system according to the present invention.

FIG. 3-B is a diagram showing the relationship of the offset and the deviation value when reading the groove-track on the optical storage medium by using the system according to the present invention.

FIG. 4-A is a diagram showing the relationship of the average offset and the average jitter when reading the optical storage medium by using the system according to the present invention.

FIG. 4-B is a diagram showing the relationship of the average offset and the average deviation value when reading the optical storage medium by using the system according to the present invention.

Figure 5:
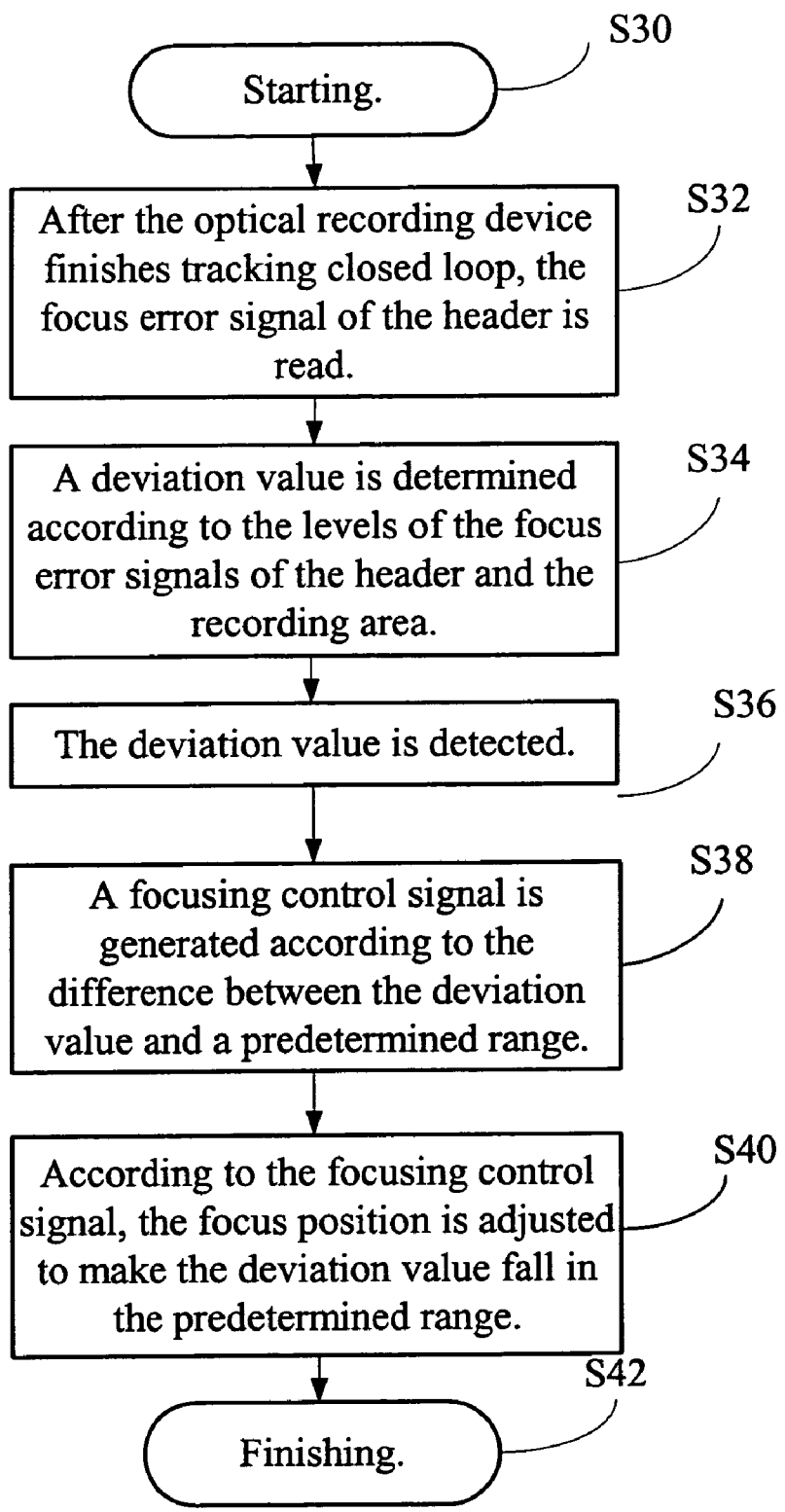

FIG. 5 is a flowchart of the focus position adjustment method according to the present invention.

DETAILED DESCRIPTION OF THE INVENTION

Please refer to FIG. 1. FIG. 1 is a schematic diagram of an optical storage device 10 with a focus position adjustment system 24 according to the present invention. The focus position adjustment system 24 according to the present invention is used for adjusting a focus position by which an optical storage device 10 reads an optical storage medium 12.

The optical storage device 10 comprises an optical pickup head 14 and a servo control unit 15. By using a spindle motor 18, the optical storage medium 12 is rotated to allow the optical pickup head 14 to read/write data from/onto the optical storage medium 12. The optical storage medium 12, particularly with DVD-RAM specification, comprises a plurality of spiral recording tracks. Each of the recording tracks comprises several sectors, and each sector has a header and a recording area for recording digital data. Usually, when the optical storage device 10 reads the header and the recording area, focus error signals are generated in different levels. The level of the focus error signal of the recording area is defined as a reference level. The difference between the level of the focus error signal of the header and the reference level is defined as a deviation value.

The optical pickup head 14 is used for generating a laser beam to project on the optical storage medium 12 and for receiving a reflective beam from the focus position. When the optical storage device 10 approaches a track of the optical storage medium 12 to read data, it goes through the tracking closed loop to allow the optical pickup head 14 to track and then to read the header and the recording area.

The servo control unit 15 comprises a signal processing unit 16. The signal processing unit 16 comprises a focus servo unit 20 and a tracking servo unit 22. The focus servo unit 20 is used for analyzing the reflective beam received by the optical pickup head 14 and for generating the focus error signal.

The servo control unit 15 further comprises the focus position adjustment system 24 according to the present invention. The focus position adjustment system 24 comprises a deviation value detection module 26 and a focus control module 28. The deviation value detection module 26 is used for determining the deviation value between the level of the focus error signal of the header and the reference level, after the optical storage device 10 finishes tracking closed loop. The focus control module 28 is used for adjusting the focus position to make the deviation value fall in a predetermined range.

The deviation value detection module 26 determines the deviation value by comparing the level of the focus error signal of the header with a reference level. The reference level is generated as the reflective beam from the recording area. The deviation value is obtained from a comparative value of the level of the focus error signal of the header and the reference level. The deviation value detection module 26 detects the deviation of focus error signal between the header and the recording area. The deviation value varies while focus position is changed. According to the difference between the deviation value and the predetermined range, the focus control module 28 generates a focusing control signal to adjust the focus position to make the deviation value fall in the predetermined range.

The focus position adjustment system 24 further comprises a driving device 30 for adjusting the focus position of the optical pickup head 14 according to the focusing control signal generated by the focus control module 28.

For a DVD-RAM system, because the structures of the header and the recording area are different, the level of the focus error signal of the header and that of the recording area are usually different. The optical storage device 10 can add an offset to the optical pickup head 14 for adjusting the focus position of the optical pickup head 14.

The optical storage device 10 generates a jitter as the optical storage device 10 reads the optical storage medium 12. When the jitter is smaller, the focus position of the optical storage device 10 is better. The jitter corresponds to the offset, and the jitter changes as the offset varies. When the offset falls in an interval, the jitter is correspondingly better.

The offset corresponds to the deviation value. The offset could be obtained by adjusting the deviation value falling in the predetermined range.

Please refer to FIGS. 2-A, 2-B, 3-A, 3-B, 4-A, and 4-B. These figures are testing results of the offset, jitter and the deviation value by using the optical storage device 10 to read the optical storage medium. FIG. 2-A is a diagram showing the relationship of the offset and the jitter when reading the land track on the optical storage medium by using the system according to the present invention. FIG. 2-B is a diagram showing the relationship of the offset and the deviation value when reading the land track on the optical storage medium by using the system according to the present invention. FIG. 3-A is a diagram showing the relationship of the offset and the jitter when reading the groove-track on the optical storage medium by using the system according to the present invention. FIG. 3-B is a diagram showing the relationship of the offset and the deviation value when reading the groove-track on the optical storage medium by using the system according to the present invention. FIG. 4-A is a diagram showing the relationship of the average offset and the average jitter when reading the optical storage medium by using the system according to the present invention. FIG. 4-B is a diagram showing the relationship of the average offset and the average deviation value when reading the optical storage medium by using the system according to the present invention.

The land track of the optical storage medium 12 is read. As shown in FIG. 2-A, when the offset is 0 mV, the jitter is not the smallest. When the offset is adjusted to 120 mV-300 mV, the correspondingly jitter is about 2%, the smallest.

Therefore, when the land track of the optical storage medium 12 is read, the smallest jitter can be obtained by controlling the offset between 120 mV and 300 mV. The optimal focus position of the optical pickup head can be obtained by controlling the deviation value under 100 mV, as shown in FIG. 2-B.

The groove track of the optical storage medium 12 is read. As shown in FIG. 3-A, when the offset is between 0 mV and 300 mV, the correspondingly jitter is about 2%, the smallest. Actually, the offset between −100 mV and 300 mV is acceptable. As shown in FIG. 3-B, the optimal jitter can be obtained by setting the deviation value under 100 mV when reading the groove-track of the optical storage medium 12.

As shown in FIG. 4-A, the offset between 120 mV and 300 mV corresponds to an acceptable range for the jitter. According to the embodiment of the present invention, the optical storage device 10 reads the optical storage medium 12. When the groove track of the optical storage medium 12 is read, an optimal focus position of reading the optical storage medium 12 can be obtained by setting the average deviation value under 100 mV, as shown in FIG. 4-B.

In contrast to the prior art, the present invention utilizes the original function of the servo control of the optical storage device and avoids complicated calculation for the jitter, without extra hardware and with only a little extra calculation. By controlling the deviation value in an appropriate range, the optimal focus position for the optical pickup head 14 to read the optical storage medium 12 can be obtained. Therefore, the present invention can avoid problems in the prior art and substantially save the time for the optical pickup head 14 to look for the optimal focus position, and hence the efficiency of the optical storage device 10 is enhanced.

Please refer to FIG. 5. FIG. 5 is a flowchart of the focus position adjustment method according to the present invention. The focus position adjustment method according to the present invention comprises the following steps.

Step S30: Start.

Step S32: Read the focus error signal of the header after the optical storage device 10 finishes tracking closed loop.

Step S34: Determine the deviation value according to the levels of the focus error signals of the header and the recording area.

Step S36: Detect the deviation value.

Step S38: Generate a focusing control signal according to the difference between the deviation value and a predetermined range.

Step S40: Adjust the focus position to make the deviation value fall in the predetermined range according to the focusing control signal.

Step S42: Finish.

The present invention provides a focus position adjustment method and system thereof for adjusting a focus position by which an optical storage device reads an optical storage medium. The method according to the present invention is performed after the optical storage device finishes tracking closed loop. According to a deviation value between the reference level and the level of the focus error signal of the header, adjust the focus position to make the deviation value fall in a predetermined range. The system according to the present invention comprises a deviation value detection module for detecting the deviation value and a focus control module for adjusting the focus position. The optimal focus position is obtained by controlling the deviation value. Accordingly, the present invention utilizes the original function of the servo control of an optical storage device without extra hardware. Also, the present invention needs only a little extra calculation to avoid complicated calculation for the jitter. Therefore, the present invention substantially saves the time for the optical pickup head to look for the optimal focus position, and hence the efficiency of the optical storage device is enhanced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A focus position adjustment system for adjusting a focus position, by which an optical storage device reads an optical storage medium, the optical storage medium comprising a header and a recording area, a focus error signal being generated as the optical storage device reads the medium, the system comprising:

a deviation value detection module to determine a deviation value according to the focus error signal generated within the header after the optical storage device finishes tracking closed loop wherein the deviation value is obtained from a comparative value of the level of the focus error signal of the header and a reference level of the recording area; and a focus control module to adjust the focus position to make the deviation value fall in a predetermined range.

2. The system of claim 1, wherein the deviation value detection module utilizes the level of the focus error signal of the header to compare with the reference level indicating the focus position, and the reference level being generated as a reflective beam is reflected from the recording area.

3. The system of claim 2, wherein the optical storage device further comprises:

an optical pickup head for generating a beam to project on the focus position of the optical storage medium and for receiving the reflective beam from the focus position; and a signal processing unit for analyzing the reflective beam received by the optical pickup head and generating the focus error signal.

4. The system of claim 3, wherein the optical storage device adds an offset to the optical pickup head for adjusting the focus position.

5. The system of claim 4, wherein the optical storage device generates a jitter as the optical storage device reads the optical storage medium, and when the jitter is smaller, the focus position of the optical storage device is better.

6. The system of claim 5, wherein the jitter corresponds to the offset, the jitter changes with the variation of the offset, and when the offset falls in an interval, the jitter is correspondingly better.

7. The system of claim 6, wherein the offset corresponds to the deviation value, and by adjusting the deviation value falling in the predetermined range, the offset is obtained, and different offsets are represented as different focus positions.

8. The system of claim 7, wherein the focus control module generates a focusing control signal according to the difference between the deviation value and the predetermined range.

9. The system of claim 8, the system further comprising a driving device for adjusting the focus position of the optical pickup head according to the focusing control signal.

10. A focus position adjustment method for adjusting a focus position, by which an optical storage device reads an optical storage medium, the optical storage medium comprising a header and a recording area, a focus error signal being generated as the optical storage device reads the medium, the method comprising the following steps:

after the optical storage device finishes tracking closed loop, determining a deviation value according to the focus error signal generated within the header wherein the deviation value is obtained from a comparative value of the level of the focus error signal of the header and a reference level of the recording area; and adjusting the focus position to make the deviation value fall in a predetermined range.

11. The system of claim 10, wherein the level of the focus error signal of the header is utilized to compare with a reference level, the reference level indicates the focus position, and the reference level is generated as a reflective beam is reflected from the recording area.

12. The method of claim 11, the method further comprising the following step:

adding an offset to the optical pickup head for adjusting the focus position.

13. The method of claim 12, the method further comprising the following step:

corresponding the offset to the deviation value; and obtaining the offset by adjusting the deviation value falling in the predetermined range wherein different offsets are represented as different focus positions.

14. The method of claim 13, the method further comprising the following step:

generating a focusing control signal according to the difference between the deviation value and the predetermined range.

15. The method of claim 14, the method further comprising the following step:

adjusting the focus position according to the focusing control signal.

* * * * *